US008488601B1

(12) United States Patent
Wadekar et al.

(10) Patent No.: US 8,488,601 B1
(45) Date of Patent: Jul. 16, 2013

(54) METHOD AND SYSTEM FOR LINK AGGREGATION

(75) Inventors: Manoj K. Wadekar, San Jose, CA (US); Edward C. McGlaughlin, Minneapolis, MN (US); Gaurav Agarwal, Los Altos, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 138 days.

(21) Appl. No.: 13/181,270

(22) Filed: Jul. 12, 2011

(51) Int. Cl.
*H04L 12/28* (2006.01)

(52) U.S. Cl.
USPC ............................................ 370/389; 370/401

(58) Field of Classification Search
None
See application file for complete search history.

(56) References Cited

U.S. PATENT DOCUMENTS

| | | | |
|---|---|---|---|
| 6,158,008 A * | 12/2000 | Maria et al. | 726/13 |
| 6,888,818 B1 | 5/2005 | Gubbi | |
| 6,973,082 B2 * | 12/2005 | Devi et al. | 370/390 |
| 2002/0133617 A1 | 9/2002 | Davies | |
| 2011/0267947 A1 | 11/2011 | Dhar et al. | |
| 2012/0144065 A1 | 6/2012 | Parker et al. | |
| 2012/0215938 A1 | 8/2012 | Fletcher et al. | |
| 2012/0230225 A1 | 9/2012 | Matthews et al. | |
| 2012/0314605 A1 * | 12/2012 | Akiyoshi | 370/252 |

OTHER PUBLICATIONS

"Office Action from USPTO dated Feb. 6, 2013 for U.S. Appl. No. 13/181,251".
"Part 3: Carrier Sense Multiple Access with Collision Detection (CSMA/CD) Access Method and Physical Layer Specifications", *IEEE*, (2005),1-454.
Wilson, et al., "Fibre Channel Framing and Signaling—3 (FC-FS-3) Rev 1.11", *American National Standards Institute, Inc.*, (Oct. 22, 2010).
Wilson, et al., "Fibre Channel Link Services (FC-LS-2) Rev 2.21", *American National Standard Institute*, (Aug. 2, 2010).

* cited by examiner

*Primary Examiner* — Robert Wilson
(74) *Attorney, Agent, or Firm* — Klein, O'Neill & Singh, LLP

(57) ABSTRACT

Method and system for a first network device and a second network device is provided. The first network device and the second network device communicate with each other via a first network link and a second network link. A traffic type between the first network device and the second network device is excluded from link aggregation. When a packet is received from the first network device; and if the packet is excluded from link aggregation, then the first network link or the second link is selected to transmit the packet based on a physical port identifier identifying a port of the first network device.

13 Claims, 3 Drawing Sheets

METHOD AND SYSTEM FOR LINK AGGREGATION

TECHNICAL FIELD

The present disclosure relates to network communications.

BACKGROUND

A computer network, often simply referred to as a network, is a group of interconnected computers and devices that facilitates communication among users and allows users to share resources. Adapters, switches and other devices are typically used during network communication. Continuous efforts are being made to improve network communication.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

In one embodiment, a machine implemented method for a first network device and a second network device is provided. The first network device and the second network device communicate with each other via a first network link and a second network link. The method includes excluding a first traffic type between the first network device and the second network device from link aggregation; receiving a packet from the first network device; and determining if the packet is excluded from link aggregation. If the packet is excluded from link aggregation, then the first network link or the second link is selected to transmit the packet based on a physical port identifier identifying a port of the first network device.

In another embodiment, a machine implemented method for a first network device and a second network device is provided. The first network device and the second network device communicate with each other via a first network link and a second network link connected to a switching device. The method includes configuring traffic between the first network device and the second network device such that link aggregation is excluded for a first traffic type and used for a second traffic type; receiving a packet from the first network device at the switching device; and determining if the packet is excluded from link aggregation.

If the packet is excluded from link aggregation, then selecting either the first network link or the second link to transmit the packet based on a physical port identifier identifying a port of the first network device. If the packet is not excluded from link aggregation, then using a hashing technique to select a link for transmitting the packet.

In yet another embodiment, a system is provided. The system includes a first network device and a second network device, communicating with each other via a first network link and a second network link connected to a switching device.

Traffic between the first network device and the second network device is configured such that link aggregation is excluded for a first traffic type and used for a second traffic type.

When a packet is received by the switching device, the switch device determines if the packet is excluded from link aggregation and selects either the first network link or the second link to transmit the packet based on a physical port identifier identifying a port of the first network device. If the packet is not excluded from link aggregation, then the switching device uses a hashing technique to select a link for transmitting the packet.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
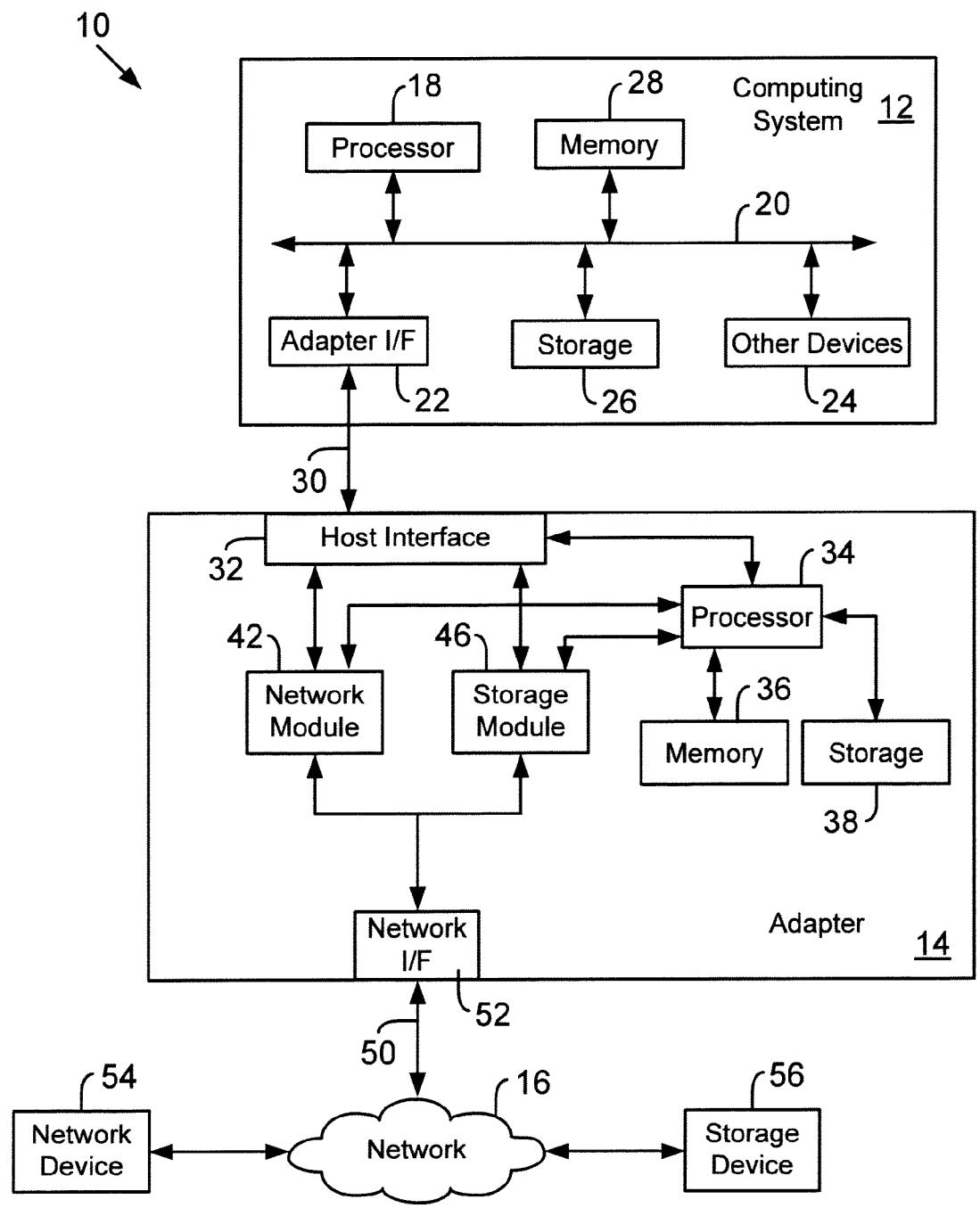
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be readable by a computing system, and encoding a computer program of instructions for executing a computer process.

FIG. 1A is a block diagram of a system 10 configured for use with the present embodiments. System 10 includes a computing system 12 (may also be referred to as "host system 12" or as a network node 12) coupled to an adapter 14 that interfaces with other devices, for example, network device 54 and storage device 56 via a connection system 16 (shown and referred to herein as network 16 that may include a local area network (LAN), wide area network (WAN), wireless network or any other network type) for sending and receiving information. The network 16 may include, for example, additional computing systems, servers, storage systems and other devices.

The computing system 12 may include one or more processors 18, also known as central processing unit (CPU). Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 18 executes computer-executable process steps out of a memory 28 and interfaces with an interconnect 20 that may be referred to as a computer bus 20. The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The computing system 12 may further include a storage device 26, which may be for example a hard disk, a CD-ROM, a non-volatile memory device (flash or memory stick) or any other storage device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces with the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing system 12 also includes other devices and interface 24, which may include a display device interface, a keyboard interface, a pointing device interface, etc. The details of these components are not germane to the inventive embodiments.

Adapter 14 may be configured to handle both network and storage traffic while interfacing with storage device 56 and network device 54. Various network and storage protocols may be used to handle network and storage traffic, for example, Ethernet, Fibre Channel, Fibre Channel over Ethernet, InfiniBand, Remote Direct Memory Access (RDMA), iSCSI and others. Some the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel is a common storage protocol used in storage area networks (SANs). Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. In one embodiment, adapter 14 can be configured to operate as a FCOE adapter and may be referred to as FCOE adapter 14 or a converged adapter 14. QLogic Corporation, the assignee of the present application, provides one such adapter. Those of ordinary skill in the art will appreciate, however, that the present embodiments are not limited to any particular protocol. The illustrated FCOE adapter 14 is merely one example of a converged network adapter that may leverage the advantages of the present embodiments.

Referring back to FIG. 1A, an adapter interface 22 couples computing system 12 to adapter 14 via a link 30. Adapter 14 interfaces with computing system 12 via a host interface 32. In one embodiment, the host interface 32 may be a Peripheral Component Interconnect (PCI) Express interface coupled to a PCI Express link (for example, link 30).

The adapter 14 may include a processor 34 (a hardware device) that executes firmware instructions out of memory 36 to control overall adapter 14 operations. Memory 36 may also include the process steps or portions thereof, according to one embodiment.

The adapter 14 may also include a storage device 38, which as an example may be a non-volatile memory, such as flash memory, or any other device. The storage 38 may store executable instructions and operating parameters that can be used for controlling adapter operations.

The adapter 14 includes a network module 42 for handling network traffic. Network module 42 interfaces with other devices via a network interface 52 and one or more links 50. The network interface 52 interfaces with link 50 via one or more ports (not shown). The network interface 52 includes logic and circuitry to receive information (for example, packets/frames) via link 50. Depending on the information type, the received information is then sent to either the network module 42 or the storage module 46. The network module 42 may include memory buffers (not shown) to temporarily store information received from other network devices 54 and transmitted to other network devices 54.

Adapter 14 may also include a storage module 46 for handling storage traffic to and from one or more storage device 56. The storage module 46 may further include memory buffers (not shown) to temporarily store information received from the storage device 56 and transmitted by adapter 14 to the storage device 56. In one embodiment, the storage module 46 is configured to process storage traffic according to the Fibre Channel storage protocol, or any other protocol.

Adapter 14 includes other modules, for example, direct memory access modules (DMA), that have not been described in detail since they are not germane to the inventive embodiments described herein.

Figure 1B:
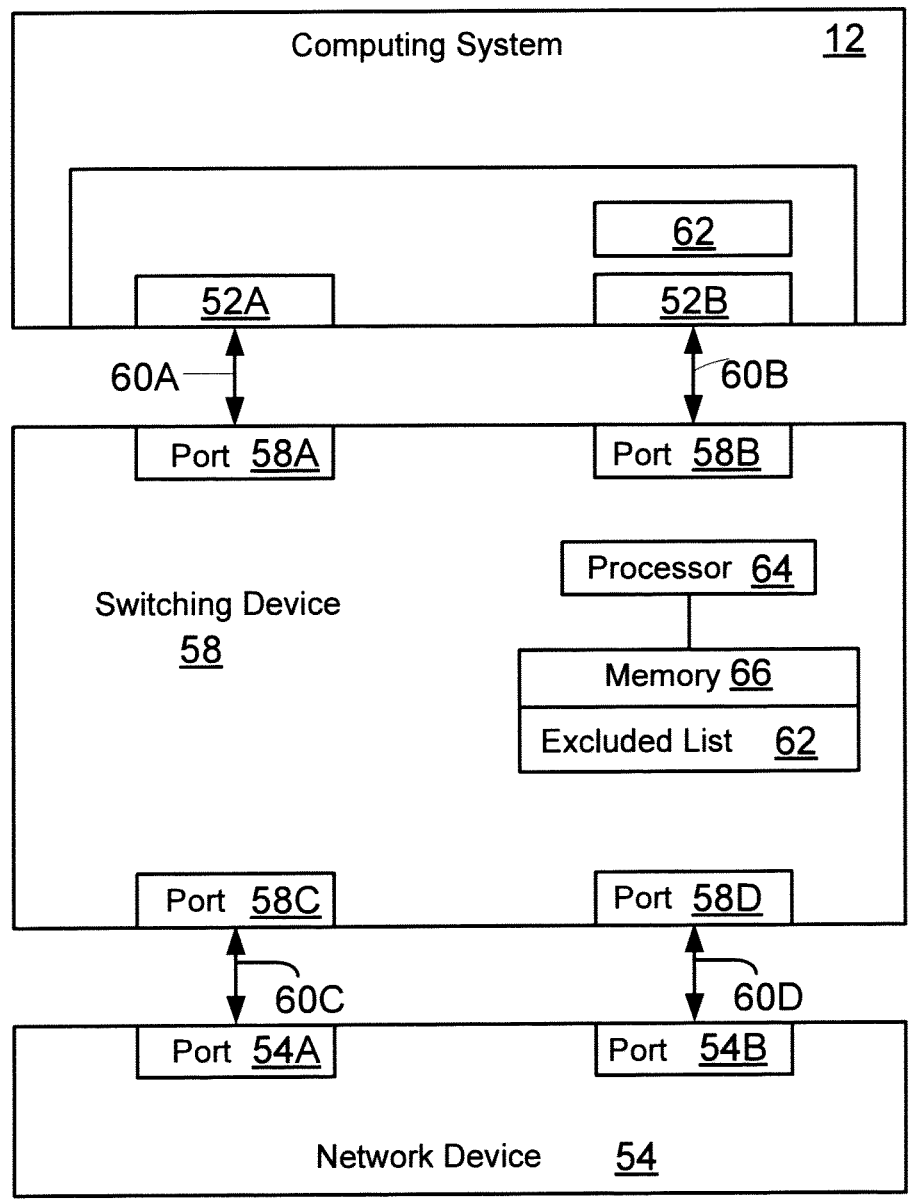
FIG. 1B shows an example of linking, according to one embodiment.

FIG. 1B shows an example of using link aggregation in system 10. Adapter 14 in this example may have two ports 52A and 52B that are each connected to network links 60A and 60B, respectively. Ports 52A and 52B may be included in network interface 52 and may include logic and circuitry to receive and transmit frames. Links 60A and 60B are connected to a switching device 58 that is also connected to another network device 54 via links 60C and 60D.

In one embodiment, switching device 58 includes a plurality of ports 58A-58D. Port 58A is coupled to port 52A via link 60A. Port 58B is coupled to port 52B via link 60B. Port 58C is coupled to port 54A of network device 54 via link 60C. Port 58D is coupled to port 54B of network device 54 via link 60D.

Switching device 58 may also include a hardware based processor 64 that executes firmware instructions out of memory 66 to control overall switch operations. Memory 66 may also be used to store an "excluded" list 62, as described below in more detail.

Link aggregation is typically used in networks to increase available bandwidth between two network nodes, for example, computing system 12 and network device 54. Certain standards, for example, IEEE 802.3ad provide a mechanism for pairing two network links (for example, 60A/60B and 60C/60D). Each network node distributes traffic among links/network ports by using certain techniques, for example, by executing a machine-executable hashing technique that uses one or more fields of a network packet to select a link/port to send or receive a network packet. The following example illustrates link aggregation with respect to FIG. 1B.

When computing system 12 sends a message to network device 54, the hashing process may select link 60A. However, the response from network device 54 may be received by computing system 12 via link 60B.

If adapter 14 is a FCOE adapter, then both ports 52A and 52B perform a standard log-in operation with switching device 58. The log-in operation is called "FLOGI", which means fabric login and allows the switching device 58 to recognize ports 52A and 52B.

If link aggregation is used in system 10 with FCOE adapter 14, then it becomes a problem, when outgoing traffic from adapter 14 is sent via link 60A and port 52A and inbound traffic for the same connection is received via link 60B at port 52B. The FCOE adapter 14 stores context information for each connection that originated from a particular port, for example, 52A. Adapter 14 then expects response/data associated with the connection to arrive at the same port, i.e. 52A. When response/data is received at port 52B for a connection that originated at port 52A, the storage module 46 and/or network module 42 are not able to process traffic due to lack of context information.

The embodiments disclosed herein provide a system and method whereby one can use link aggregation for one traffic type, for example, Ethernet based traffic and exclude another traffic type, for example, FCOE traffic.

Figure 2:
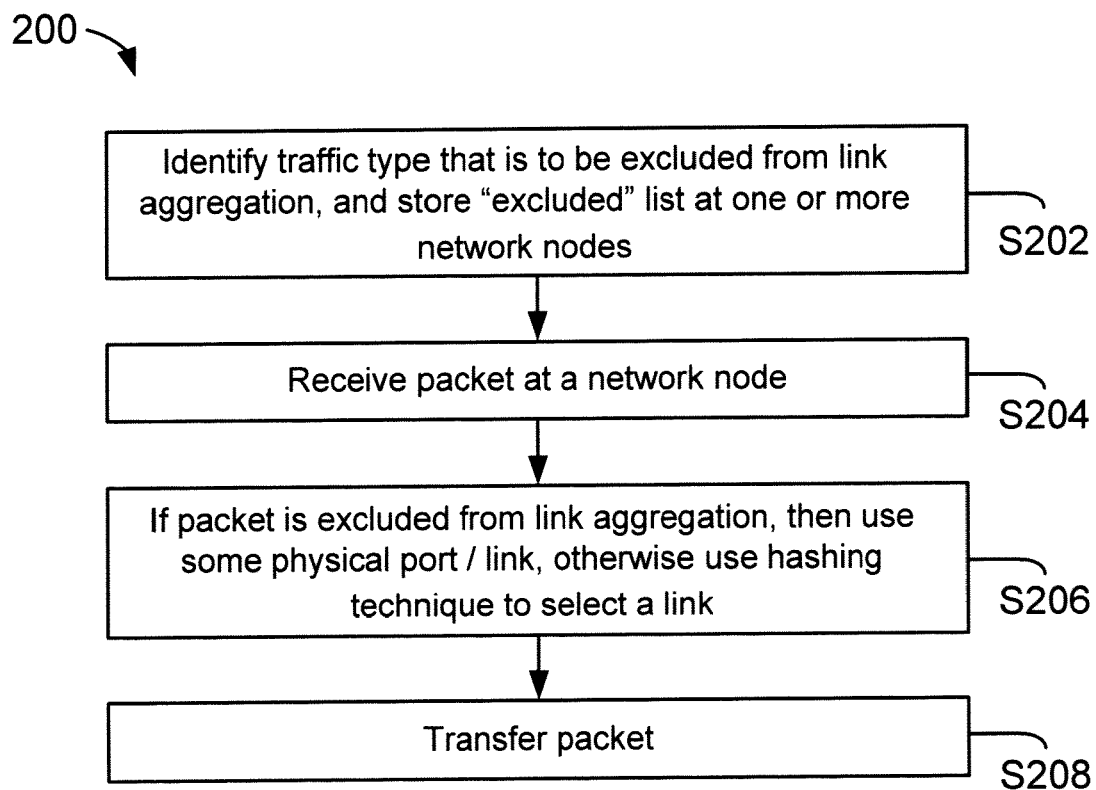
FIG. 2 is a process flow diagram, according to one embodiment.

Process Flow:

FIG. 2 shows a process 200 for handling link aggregation and excluding certain traffic type from link aggregation, according to one embodiment. Process 200 uses link aggregation for certain protocols, for example, Ethernet and excludes or does not use link aggregation for other protocols, for example, FCOE.

Process 200 begins in block S202 where traffic that is to be excluded from link aggregation is identified and configured. In one embodiment, an "excluded" list 62, is generated and stored at one or more network nodes, for example, computing system 12, switching device 58 and/or network device 54. The excluded list may be a data structure stored at a memory location by a processor executable application. For example, excluded list 62 may be stored at adapter 14, switching device 58 and network device 54, as shown in FIG. 1B. The excluded list 62 may be created by a user using a computing system (for example, 12) via a user interface (not shown).

The excluded list 62 may also be generated by a rule based process, where a user identifies certain parameters, to identify traffic to which link aggregation is not applied or is applied. For example, the user may identify an EtherType value to identify a protocol, or virtual local area network identifiers (VLAN IDs) to exclude certain VLANs from link aggregation. The embodiments of this disclosure are not limited to any particular parameter that is used to determine what traffic type is to be excluded from link aggregation.

In another embodiment, the network nodes, for example, computing system 12, switch device 58 and network device 54 may negotiate which packet type will be excluded from link aggregation. This may be achieved by adding a flag or value or TLV (Type/Length/Value field) to a discovery packet complying with a specific protocol type, for example, the Data Center Bridging control discovery protocol (DCBX) defined by IEEE.802 standard used for discovering devices and their capabilities.

Once the communicating nodes become aware of what packet type to exclude from link aggregation, communication begins in block S204, when a packet is received at a network node, for example, switching device 58. The switch device 58 parses the packet header and determines if the packet belongs to the excluded list 62. If the packet belongs to the excluded list, then link aggregation is not used to select the link for transmitting the packet. Instead, switching device 58 selects the same physical link (e.g. 60A) that was used for a particular flow for the received packet and does not use hashing technique to select a link from among a plurality of available links.

If the received packet is not a part of the excluded list, then a hashing technique may be used to select a link from among a plurality of available links. Thereafter, in block S208, the packet is transmitted on the selected link.

In one embodiment, certain protocols, for example, FCOE, are excluded from link aggregation, and other protocols, for example, Ethernet can use link aggregation. This results in better use of available bandwidth without causing problems for protocols that may not be conducive to link aggregation.

Although the present disclosure has been described with reference to specific embodiments, these embodiments are illustrative only and not limiting. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine-implemented method for a first network device and a second network device to communicate with one another, said method comprising:
    configuring a switching device that is connected to the first network device and the second network device via a first network link and a second network link to exclude a first traffic type from link aggregation while applying link aggregation for a second traffic type;
    receiving a packet from the first network device at the switching device;
    determining if the packet from the first network device is excluded from link aggregation; and
    if the packet is not excluded from link aggregation, then using a hashing technique on parameters within the packet to select either the first link or the second link for transmitting the packet to the second network device.

2. The method of claim 1, wherein the packet is an Ethernet packet.

3. The method of claim 1, wherein the first network link and the second network link are Ethernet links.

4. The method of claim 1, wherein a test for determining whether the first traffic type is excluded from link aggregation is determining whether the first traffic type is Fibre Channel over Ethernet.

5. A system, comprising:
    a first network device;
    a second network device; and
    a switching device;
    wherein the switching device interconnects to the first network device and the second network device via a first link and a second link and the switching device is configured to exclude a first traffic type from link aggregation while applying link aggregation to a second traffic type;
    upon receiving a packet the switching device determines if the packet is excluded from link aggregation and selects either the first network link or the second network link to transmit the packet to the second network device based on the physical port identifier associated with the port on the first network device from which the packet was received; and
    if the received packet was not excluded from link aggregation then the switching device uses a hashing technique on parameters within the packet to select either the first link or the second link to transmit the packet to the second network device.

6. The system of claim 5, wherein the packet is an Ethernet packet.

7. The system of claim 5, wherein the first link and the second link are Ethernet links.

8. The system of claim 5, wherein a test for determining whether the first traffic type is excluded from link aggregation is determining whether the first traffic type is Fibre Channel over Ethernet.

9. A machine-implemented method for a first network device and a second network device to communicate with one another, said method comprising:
    configuring a switching device that is connected to the first network device and the second network device via a first network link and a second network link to exclude a first traffic type from link aggregation while applying link aggregation for a second traffic type;
    receiving a packet from the first network device at the switching device;
    determining if the packet from the first network device is excluded from link aggregation based upon parameters within the packet; and
    if the packet is excluded from link aggregation, selecting either the first network link or the second link to transmit the packet based on a physical port identifier identifying a port of the first network device from which the packet was received.

10. The method of claim 9, wherein if the packet is not excluded from link aggregation, the switching device using a hashing technique on parameters within the packet to select either the first link or the second link for transmitting the packet to the second network device.

11. The method of claim 9, wherein the packet is an Ethernet packet.

12. The method of claim 9 wherein the first network link and the second network link are Ethernet links.

13. The method of claim 9, wherein a test for determining whether the first traffic type is excluded from link aggregation is determining whether the first traffic type is Fibre Channel over Ethernet.

* * * * *